United States Patent
Bauer et al.

[11] Patent Number: 5,865,465
[45] Date of Patent: Feb. 2, 1999

[54] AIR-BAG

[75] Inventors: Wolfgang Bauer, Germering, Germany; Jan Huibert Valkenburg, Congleton, United Kingdom

[73] Assignee: Airbags International Limited, Congleton, United Kingdom

[21] Appl. No.: 877,468

[22] Filed: Jun. 17, 1997

[30] Foreign Application Priority Data

Jun. 17, 1996 [GB] United Kingdom ............... 9612615

[51] Int. Cl.$^6$ .................................................. B60R 21/16
[52] U.S. Cl. ........................................................ 280/743.1
[58] Field of Search ............................ 280/743.1, 731, 280/732

[56] References Cited

U.S. PATENT DOCUMENTS

| | | | |
|---|---|---|---|
| 5,140,799 | 8/1992 | Satoh | 280/743.1 |
| 5,162,035 | 11/1992 | Baker | 280/743.1 |
| 5,342,087 | 8/1994 | Oda | 280/743.1 |
| 5,398,968 | 3/1995 | Emambakhsh et al. | 280/743.1 |
| 5,425,552 | 6/1995 | Linder | 280/743.1 |

*Primary Examiner*—Kenneth R. Rice
*Attorney, Agent, or Firm*—Venable; George H. Spencer

[57] ABSTRACT

An air-bag comprises two super-imposed layers of fabric (2,3). A folding thread (10,11) is provided having one end thereof securely fastened to the fabric forming the bag in a region defined by a seam (4), each thread being connected loosely alternately to each of the layers of fabric. The thread (10,11) has a portion accessible from the exterior of the bag. If that portion of the thread is pulled, the region where the thread is securely fastened to the fabric of the bag is drawn towards the region where the thread is being pulled, thus folding that part of the bag between these two points with a concertina-fold.

23 Claims, 6 Drawing Sheets

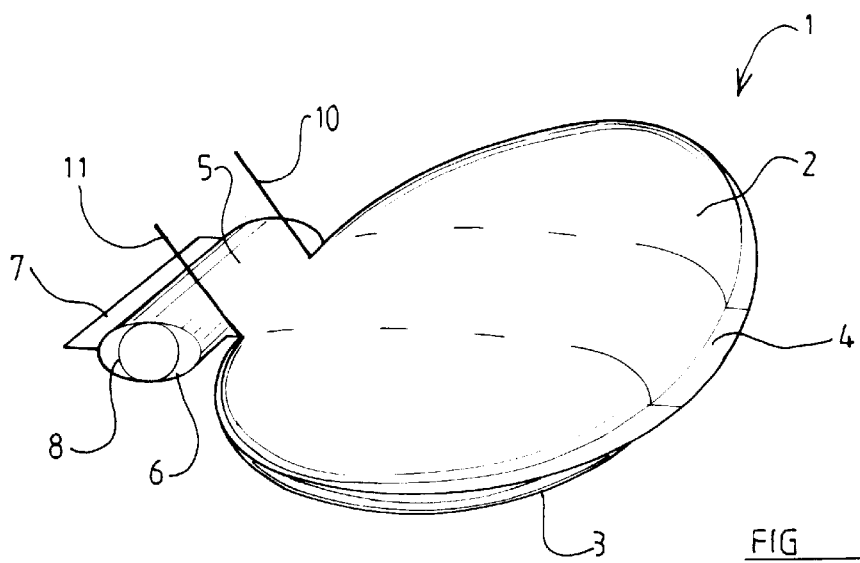
FIG 1
FIG 2
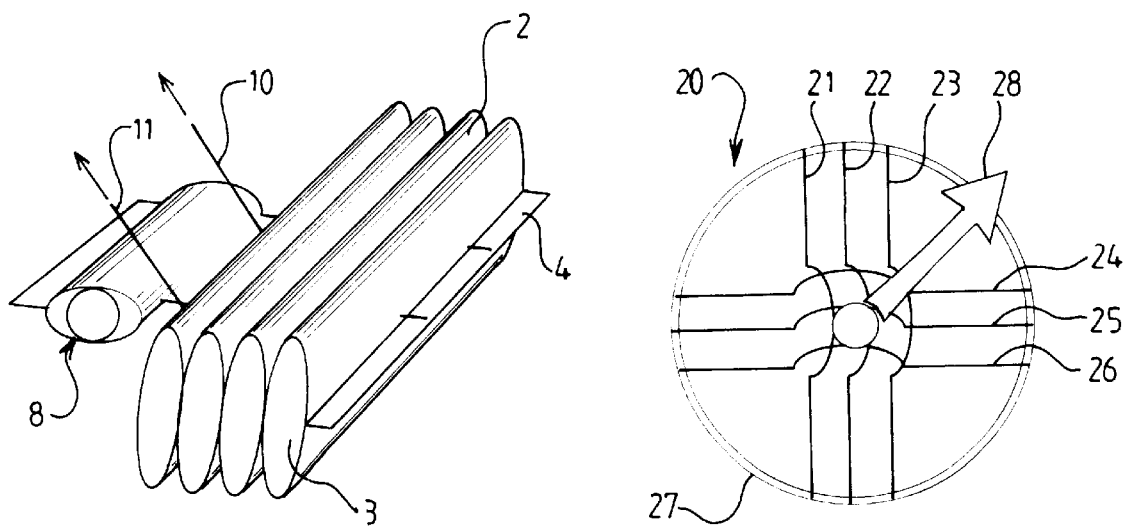
FIG 3
FIG 4

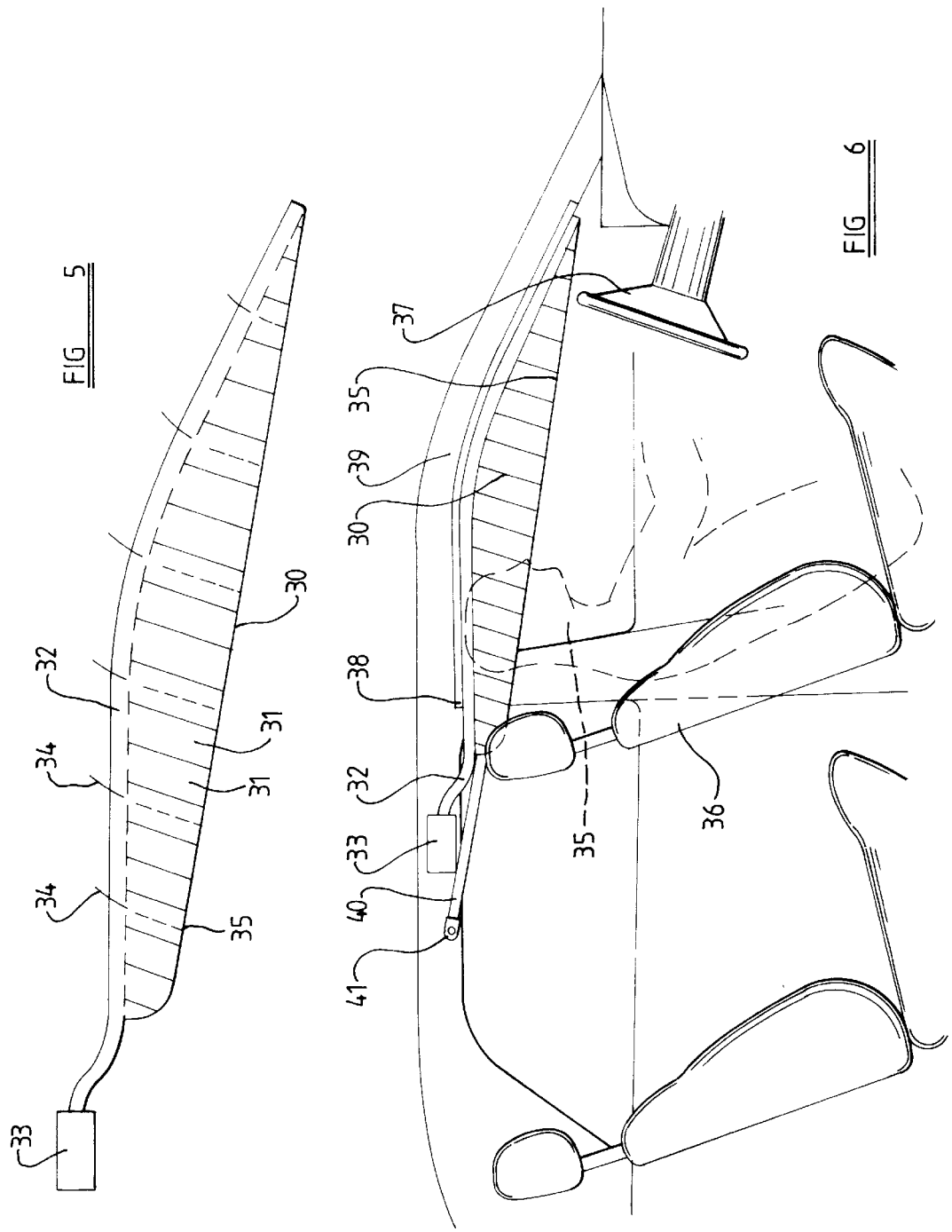

AIR-BAG

Air-bags are provided within most vehicles.

The air-bag is initially in an uninflated state, but in the event that an accident should arise, a gas generator is activated which inflates the air-bag. Inflated air-bags provide protection for the driver of the vehicle or an occupant of the vehicle.

In the final stages of manufacture an air-bag has to be folded so that it is in a compact state, so that the air-bag can be stored within a housing or the like. However, the air-bag must be folded in such a way that the air-bag can inflate smoothly and rapidly when the gas generator is activated.

The present invention relates to an air-bag which is adapted to be folded easily, and also relates to a method of folding an air-bag.

According to this invention there is provided an air-bag, the air-bag being formed of fabric and being provided with at least one folding thread, the folding thread being connected loosely to discrete regions of the fabric, so that said regions of fabric may be slid along the folding thread, the thread having a part thereof accessible from the exterior of the bag.

In this Specification the term "thread" is to be understood to mean a thread, yarn, cord, tape or the like.

In one embodiment the folding thread has one part thereof secured to a region of the fabric of the bag, the arrangement being such that if the part of the thread accessible from the exterior of the bag is pulled relatively to the bag, the region where the thread is securely fastened to the fabric of the bag is drawn towards the region where the said part of the thread is accessible from the exterior of the bag, thus folding that part of the bag which initially lies between the region where the thread is securely fastened to the fabric of the bag and the region where the said part of the thread is accessible from the exterior of the bag It is to be understood that the bag may be held still and the thread may be pulled away from the bag, thus applying tension to the thread, or alternatively the free end of the thread may be held still and the bag may be pulled relatively to the thread. In either event, the said regions will slide relatively to the thread, thus assisting the correct folding of the bag, In one embodiment the air-bag comprises two super-imposed layers of fabric, the folding thread being connected loosely to said discrete regions of fabric which alternate between the two layers In an alternative embodiment the air-bag comprises two super-imposed layers of fabric, the folding thread being connected loosely to said discrete regions of fabric which are spaced apart in the same layer. In such an embodiment it is preferred there are at least two folding threads, a respective thread being associated with each of the said two layers of fabric Preferably the said one end of the folded thread is secured to the fabric forming the bag in the region of a seam which inter-connects two layers of fabric.

In one embodiment the said part of the folding thread accessible from the exterior of the bag is a free end of the thread opposed to the said one end.

In an alternative embodiment of the invention the said part of the folding thread that is accessible from the exterior of the bag is a central region of the thread, the thread having two ends, each end being secured to the fabric forming the bag.

Preferably the air-bag, in the un-inflated state, is of substantially circular form.

Conveniently a plurality of folding threads are provided which extend diametrically across the bag.

In one embodiment the or each folding thread extends parallel with one diameter of the bag, the said one end of the thread being secured to part of the outer peripheral seam of the bag, and the free end of the threads emerging from the bag at a point adjacent a gas generator which is associated with the bag.

In an alternative embodiment the air-bag is a circular air-bag, and at least two folding threads are provided which extend diametrically across the bag, the said two threads extending orthogonally to each other and intersecting substantially at the centre of the bag, parts of the threads in the region of the intersection being accessible from the exterior of the bag, the ends of each thread being secured to a peripheral seam defining the outer periphery of the bags In an alternative embodiment the air-bag may be of elongate form for use as a side bag. The bag may be divided into parallel cells, there being a plurality of folding threads extending parallel to the cells.

In certain embodiments the said discrete regions are evenly spaced. In alternative embodiments the said discrete regions are unevenly spaced.

Conveniently the bag is folded and a part of one or more folding threads extends from the bag and is mounted to guide the bag as it inflates.

Preferably the air-bag includes a folding thread, the thread having a first end secured to the bag, and having a second end secured to the bag, the thread having been partly withdrawn from the bag before the second end is secured to the bag.

Conveniently the thread is adapted to break when a predetermined pressure is present within the bag.

This invention also relates to a method of folding an air-bag, the method comprising the steps of taking an air-bag as described above and applying tension to the parts of the folding thread or threads accessible from the exterior of the bag in order to fold the bag. The method may comprise the additional step of cutting off the part of the or each folding thread that is accessible from the exterior of the bag at the end of the folding operation.

In one embodiment the method comprises the step of securing the folding thread to the air-bag after withdrawing part of the folding thread from the air-bag.

In order that the invention may be more readily understood, and so that further features thereof may be appreciated, the invention will now be described, by way of example, with reference to the accompanying drawings in which:

FIG. 1 is a perspective view of an air-bag arrangement,

FIG. 2 is a diagrammatic sectional view of the arrangement of FIG. 1,

Figure 7:
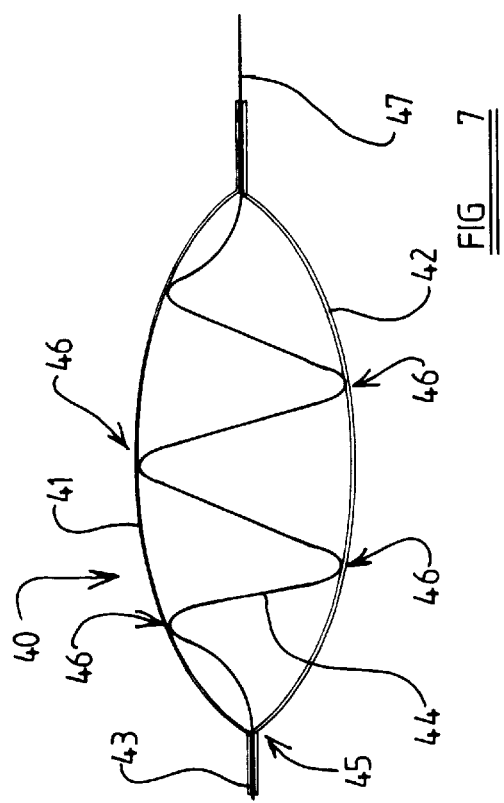
Figure 8:
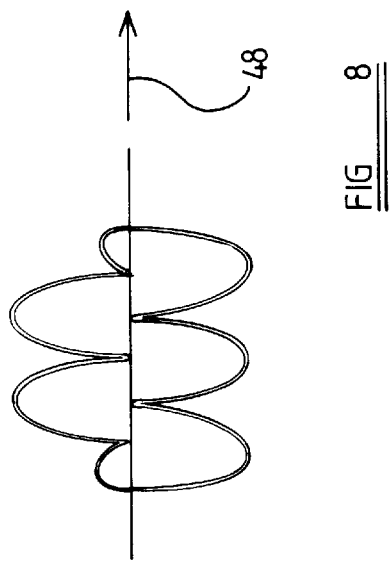
Figure 9:
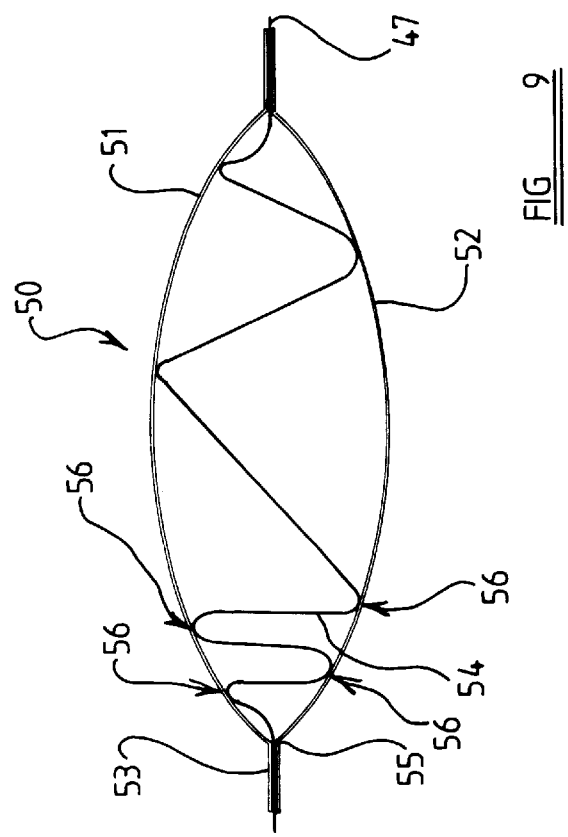
Figure 10:
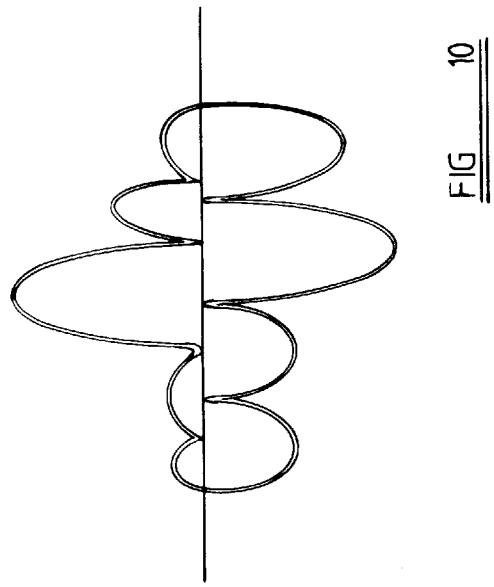
Figure 12:
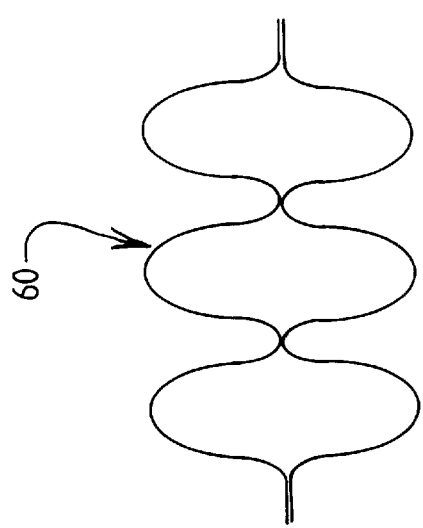
Figure 14:
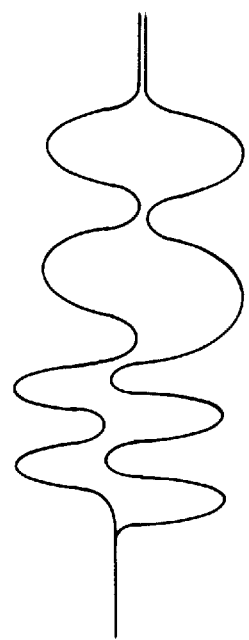
Figure 11:
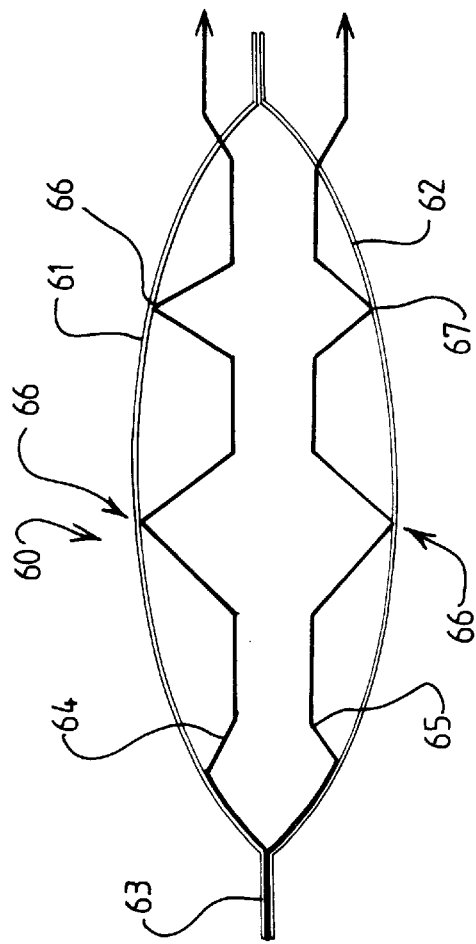
Figure 13:
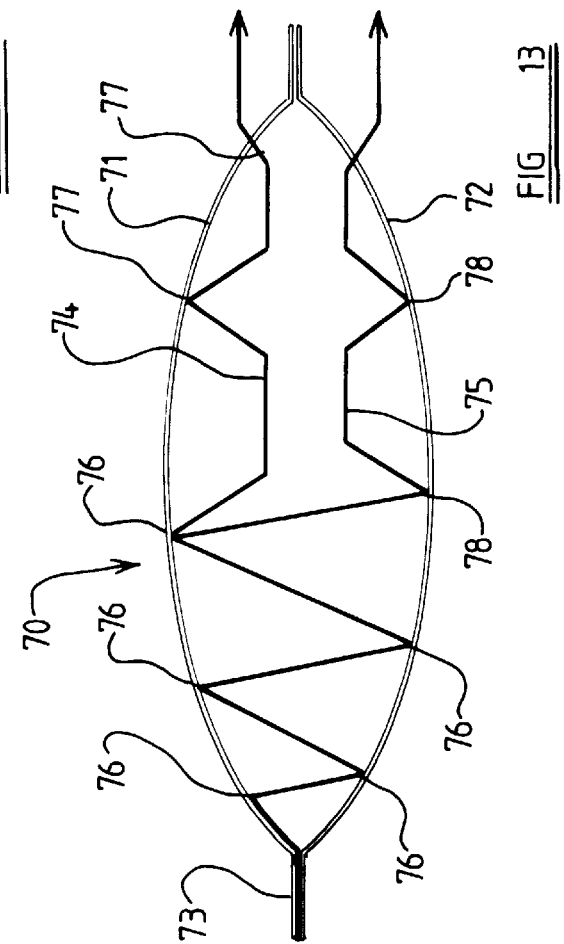
Figure 15:
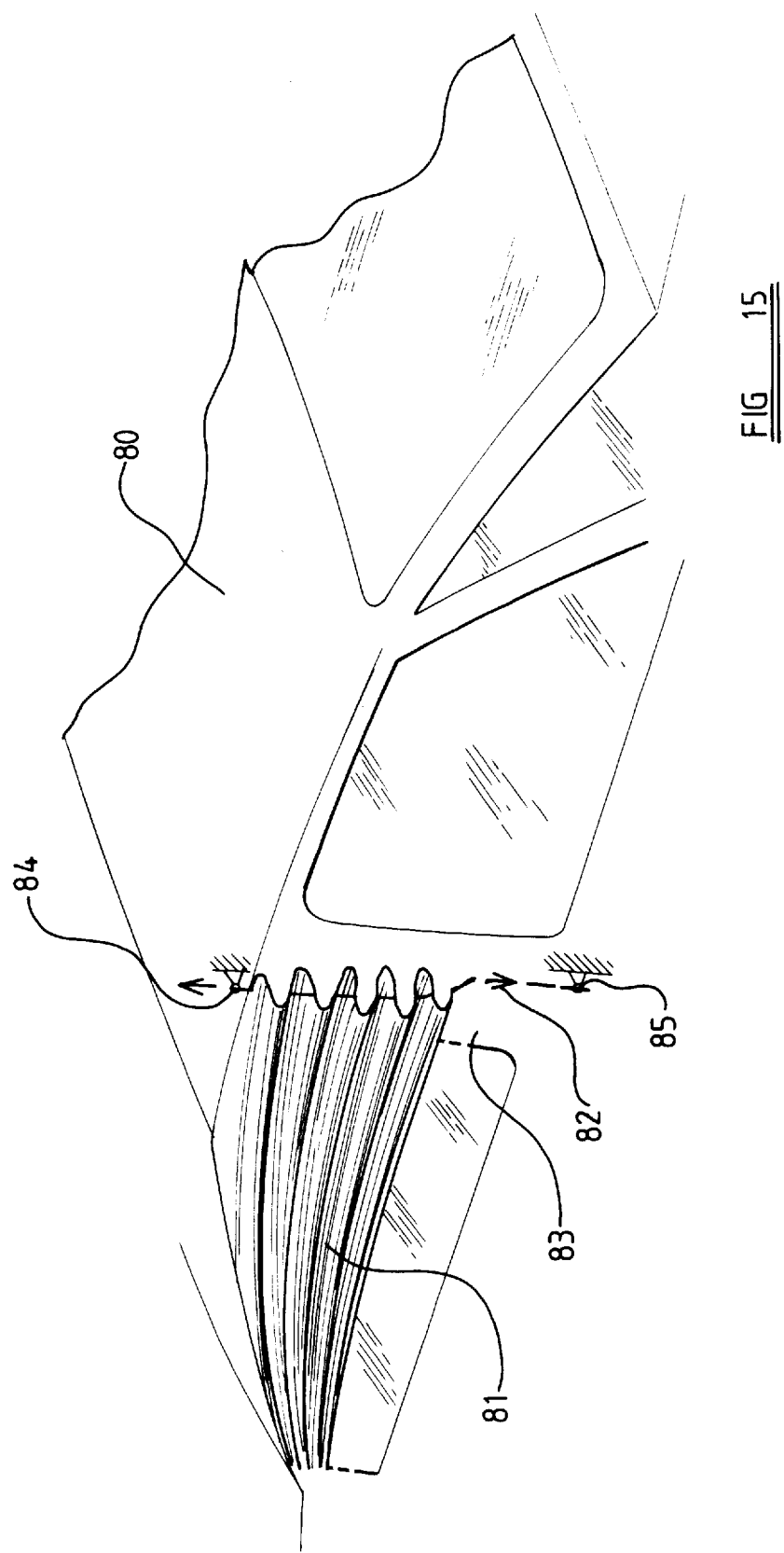
Figure 16:
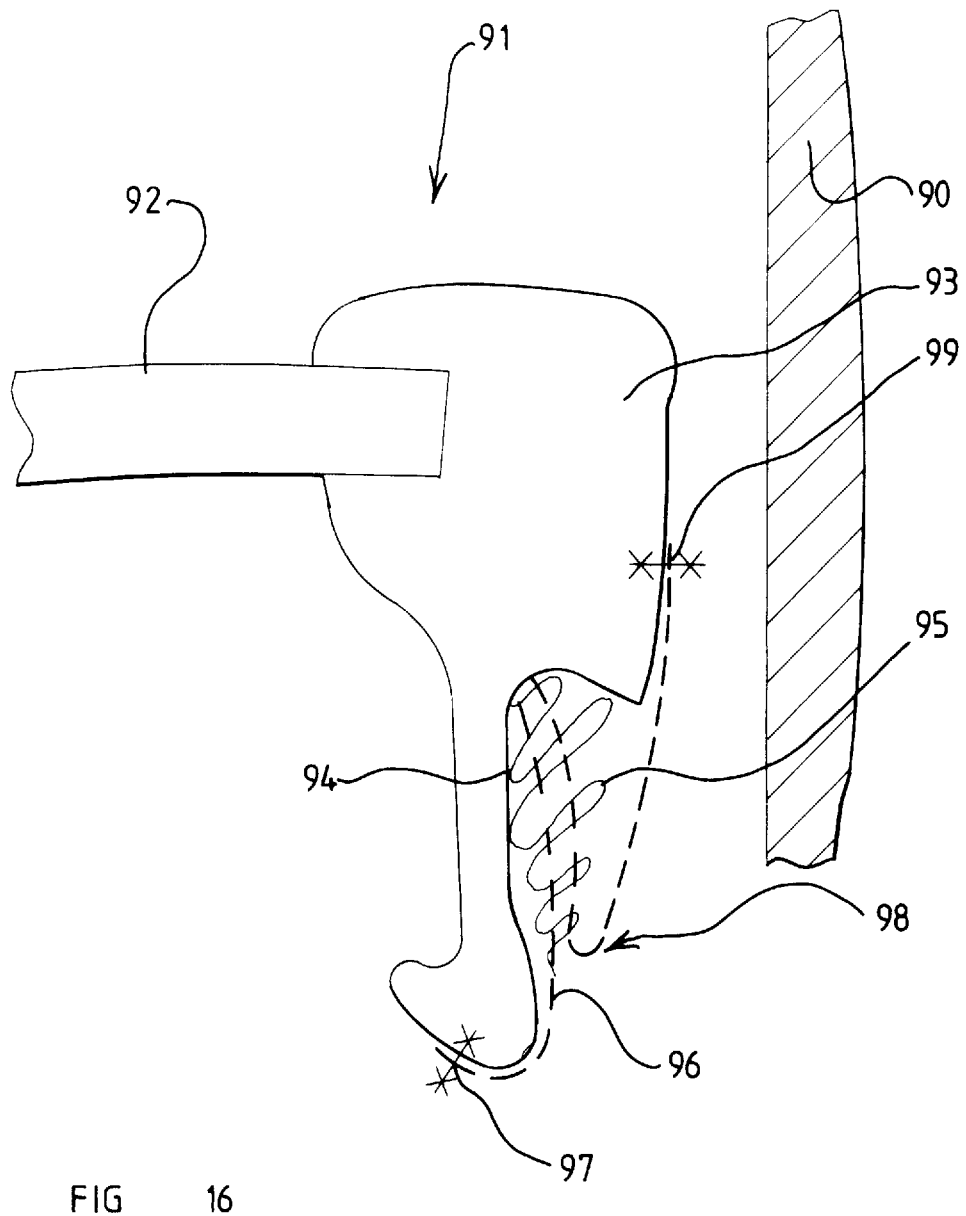

FIG. 3 is a side view of the arrangement of FIG. 1 part way through the folding process (with part of the bag being cut away for the sake of clarity of illustration), FIG. 4 is a diagrammatic view of an alternative embodiment of the invention, FIG. 5 is a perspective view of an alternative form of air-bag intended as a side bag, FIG. 6 is a view illustrating the bag of FIG. 5 in the operative condition, FIG. 7 is a sectional view of a circular bag similar to that shown in FIG. 1, FIG. 8 illustrates the bag of FIG. 7 when partly folded, FIG. 9 illustrates an alternative form of bag similar to that shown in FIG. 1, FIG. 10 shows the bag of FIG. 9 when partly folded, FIG. 11 illustrates a further type of circular bag similar to that shown in FIG. 1, FIG. 12 shows the bag of FIG. 11 partly folded, FIG. 13 shows part of a circular bag similar to that shown in FIG. 1, FIG. 14 shows the bag of FIG. 13 when partly folded, FIG. 15 illustrates schematically part of a motor vehicle, also illustrating schematically an air-bag partly inflating, and FIG. 16 is a horizontal sectional view through part of a vehicle illustrating an air-bag arrangement.

An air-bag in accordance with the invention may be a one-piece woven air-bag. Such an air-bag may be fabricated using a technique described in WO90/09295. In fabricating a one-piece woven air-bag, two webs of fabric are woven simultaneously and in pre-selected regions, the threads from each of the webs of fabric are inter-woven, so that in these areas effectively only one web of fabric is provided, Thus, the said areas effectively define seams which join together the two webs of fabric. The present invention will be described with reference to such a one-piece woven air-bag, but it is to be appreciated that the invention may also be applied to other types of air-bag, for example, an air-bag made of two super-imposed layers of fabric that are stitched together.

Referring initially to FIG. 1 of the accompanying drawings, and air-bag 1 is illustrated. The air-bag 1 is an air-bag which, when inflated, will be substantially spherical, and which may thus be used as an air-bag to provide protection for an occupant or driver of a vehicle. The un-inflated air-bag is thus circular. The air-bag 1 comprises an upper layer of fabric 2 and a lower layer of fabric 3, each of generally circular form, the layers of fabric effectively being super-imposed and having their peripheral outer regions inter-connected by means of a seam 4. As described above, the seam 4 may be integrally woven with the upper layer of fabric 2 and the lower layer of fabric 3. Alternatively, the seam may be a stitched seam. The layers of fabric are generally of circular form, but each have a radially outwardly directed extension 5,6, the extensions being inter-connected by a further seam 7. The extensions 5 and 6 surround a gas generator 8. The gas generator 8 is thus in communication with the interior 9 of the air-bag defined by the upper and lower layers of fabric 2,3.

In the bag illustrated in FIG. 1, two folding threads 10,11 are provided. Each folding thread extends substantially diametrically across the air-bag 1, the two threads each being parallel with a notional diametric line. As can be seen clearly from FIG. 2, the folding thread 11 is connected alternately to evenly spaced apart regions of the upper layer of fabric 2 and the lower layer of fabric 3. In each case the folding thread is only loosely connected to a discrete region of the layer of fabric so that, when tension is applied to the folding thread, the thread may slide relative to the layer of fabric. It is to be appreciated that tension may be applied to the folding thread, by holding the free end of the folding thread and applying a force to the air-bag, thus tending to slide the discrete regions where the fabric is loosely connected to the folding thread along the folding thread. Alternatively, the air-bag itself may be held stationary and the free end of the folding thread may be pulled away from the bag, thus again causing thread to move slidably relative to the discrete regions of the layers of fabric where the thread is loosely connected to the fabric.

Each folding thread 10 and 11 extends across the entire diameter of the bag, and extends into the peripheral seam 4. In the region of the seam 4, the free end of each folding thread is tightly bonded with the integral layer of fabric which forms the seam 4. Thus, one end of each folding thread 10,11 is securely fastened to the fabric in the region of the seam 4,. whereas the other end of each thread 10,11 projects from the bag, and is thus accessible from the exterior of the bag. The end of each thread that is accessible extends from a region of the bag adjacent the gas generator 8.

Referring now to FIG. 3, if tension is applied to the ends of the threads 10,11, accessible from the exterior of the bag, the seam 4 will be drawn towards the gas generator 8. As this happens the upper and lower layers of fabric 2,3 will be drawn to a folded state in a concertina-like fashion. Thus the fabric of the bag located between the seam 4 and the gas generator 8 will be folded in a substantially predetermined manner It will be appreciated, therefore, that by drawing on the accessible ends of folding threads 10 and 11 the entire bag can be folded relatively swiftly. Also, since the bag has been folded with concertina-like folds, the bag will be inflated smoothly when gas is generated by the gas generator 8.

Whilst one embodiment of the invention has been described with reference to FIGS. 1 to 3, it is to be appreciated that many modifications may be effected It is to be appreciated that in the embodiment of FIG. 1, one end of the thread is securely connected to part of the fabric forming the bag, for example the seam forming the outer periphery of the bag. In alternative embodiments the thread may be connected to other parts of the bag and thus it is possible for the thread to have two free ends extending beyond the outer periphery of the bag with an intermediate part of the thread being securely connected to a region of the fabric of the bag.

In yet another alternatively embodiment the thread may, over its entire length, be loosely connected to the fabric of the bag, with two free ends extending from the outer periphery of the bag. An intermediate part of the thread may be accessible to be gripped by a gripping mechanism forming part of a folding frame, thus enabling tension to be applied between the bag and the thread to enable the folding effect to be achieved.

FIG. 4 illustrates an alternative embodiment of an air-bag which is a circular bag 20. The air-bag may be intended for use in protecting the driver or occupant of a vehicle. In this embodiment, two sets of folding threads 21,22,23; and 24,25,26 are provided. The folding threads extend, in two groups, diametrically across the circular air-bag 20, the two groups intersecting substantially at the centre of the bag. Each end of each of the threads is securely connected to the peripheral seam 27 that forms the outer periphery of the bag in the form illustrated. Each folding thread is loosely connected to spaced apart regions of the fabric, as in the embodiments described above. Thus, each end of each folding thread is securely fastened to the fabric forming the bag Parts of the threads in the region where the threads inter-connect are accessible from the exterior of the bag. Thus, the part of each thread that is accessible is a central region of the thread. If the accessible parts of the threads are pulled upwardly away from the bag, as indicated by the arrow 28, the entire outer periphery of the bag will be drawn in towards the centre of the bag, and a plurality of concertina-like folds will be produced. Thus, the fabric of the bag between the peripheral seam and the centre of the bag will be folded.

Referring now to FIGS. 5 and 6, a further embodiment of an air-bag incorporating folding threads in accordance with the invention is illustrated, the air-bag being of elongate form and being intended for use as a side bag, which may be termed a side curtain. In use, a side bag or side curtain is located between the driver or occupant of the vehicle and the side of the vehicle, and a typical side bag is intended to be inflated in response to a side impact.

Referring particularly to FIG. 5, an elongate air-bag 30 is illustrated, the lower part of the air-bag being divided into a plurality of cells 31. At the upper part of the air-bag there is an integrally formed conduit 32 which extends to a gas generator 33. A plurality of folding threads 34 are illustrated. Each folding thread extends from a seam 35 provided at the lower edge of the bag axially along an individual cell 31, the folding thread having a terminal portion extending out of the bag adjacent the integral gas conduit 32. The folding threads are loosely connected to spaced apart discrete regions of the fabric forming the bag. By pulling the threads, the fabric defining the part of the bag that incorporates the cells 31 is drawn to lie immediately adjacent the part of the bag defining the conduit 32.

The bag illustrated in FIG. 5 is formed from two superimposed layers of fabric, and preferably regions of the fabric are woven together so that the bag is a one-piece woven air-bag. The areas of fabric that are woven together define the outer seam forming the outer periphery of the bag, and also define the inner seams which separate the individual cells and seams which define the gas flow conduit 32.

FIG. 6 illustrates the bag of FIG. 5 when in use in a motor vehicle.

A driver of the motor vehicle is shown sitting on a seat 36 located in front of the steering wheel 37.

The air-bag 30 is initially stored within a recess 38 located within the roof 39 of the motor vehicle, just above the door. Connected to or formed integrally with the air-bag is a strap portion 40 which extends from the rearward part of the bag to a mounting point 41 located at the rear of the vehicle.

It is to be appreciated that in response to a side impact, the air-bag is inflated. Gas from the gas generator 33 flows along the gas conduit 32 and into the cells 31, moving the air-bag 30 to the position illustrated in which the air-bag is located between the head of the driver and the upper part of the window in the door adjacent the driver. The bag thus minimises any risk of the head of the driver inadvertently passing through the window opening.

It is to be appreciated that the folding threads may be made of a material which is different from the material forming the rest of the fabric that constitutes the air bag. This may ensure that the folding threads have sufficient strength.

The folding threads may be incorporated in the bag during the weaving of the one-piece woven bag.

It is to be appreciated that once an air-bag has been folded using folding threads as herein described, the bag may be introduced into an appropriate housing to retain the bag in the folded state. The portion of the or each folding thread which has been pulled out of the bag may then simply be cut Then, when the bag is inflated, it will not be necessary for all of the folding thread to be drawn back into the bag, but instead only the very short length of folding thread that remains in the bag will have to pass through the regions where the thread is connected to the fabric, thus releasing the fabric to permit inflation of the bag.

It is to be appreciated that in the embodiment illustrated in FIGS. 1 to 3, the discrete regions where the folding thread is connected to the opposed fabric layers are substantially evenly spaced. FIG. 7 illustrates a bag of an equivalent design for the purposes of explanation.

Thus, FIG. 7 illustrates a section through a circular air-bag 40 comprising two super-imposed layers of fabric 41,42 which are inter-connected by a peripheral seam 43. A folding thread 44 is provided having one end 45 securely connected to the peripheral seam 43. The thread 44 extends diametrically across the bag and is loosely connected to regions 46 of the fabric forming the bag, these regions alternating between the upper layer 41 and the lower layer 42. The regions 46 are substantially evenly spaced apart. The folding thread 44 has a free end protruding from the air-bag 40.

When the bag is folded, the free end 47 of the folding thread 44 is pulled, generally as indicated by the arrow 48 in FIG. 8, while the bag is kept stationary, and the bag folds in a generally "concertina" form, as can be seen in FIG. 8. The folds are of substantially equal sizes.

Referring now to FIG. 9, in an alternative embodiment of the invention, which is similar to that shown in FIG. 7, in an air-bag 50 which comprises two superimposed layers of fabric 51,52 inter-connected by a peripheral seam 53, a folding thread 54 is provided. One end 55 of the folding thread is connected securely to the seam 53. The folding thread is connected to regions 56 in the upper layer of fabric 51 and the lower layer of fabric 52. The regions 56 alternate between the upper layer and the lower layer, but are not evenly spaced. As can be seen from FIG. 10, when a bag of this type is folded, by applying a tension to the folding thread the folds are uneven and of different sizes. This may substantially alter the inflation characteristic of the bag or, alternatively, may facilitate the subsequent folding of the bag so that it will fit an appropriate housing.

FIG. 11 illustrates an alternative form of air-bag 60, again comprising an upper layer of fabric 61 and a lower layer of fabric 62 inter-connected by means of a peripheral seam 63. In this embodiment two folding threads 64,65 are provided. The folding thread 64 is loosely connected to spaced apart regions 66 formed in the upper layer of fabric 61. Thus, the folding thread 64 is only associated with the upper layer of fabric and is not associated with the lower layer of fabric.

The folding thread 65 is loosely connected to region 67 which are spaced apart on the lower layer of fabric. Thus, the folding thread 65 is only associated with the lower layer of fabric 62.

Folding is effected by applying tension to the folding threads and is equivalent to the folding of the various embodiments described above.

It can be seen, from FIG. 1, that the regions 66 in the upper layer of fabric are evenly spaced apart and the regions 67 in the lower layer of fabric are aligned with the regions 66 and are also evenly spaced apart. As can be observed from FIG. 12, which shows the air-bag 60 when partially folded, a very even folding characteristic is obtained of a "concertina" form. It is to be appreciated that if the regions 66 were unevenly spaced apart, then again folds of different dimensions could be achieved, which, again, may provide a desired inflation characteristic for the bag or may enable the bag to be folded to fit an available housing.

FIG. 13 illustrates a further form of air-bag 70 comprising an upper layer of fabric 71 and a lower layer of fabric 72 inter-connected by a peripheral seam 73. Two folding threads 74,75 are provided. The folding threads each have one end connected to the seam 73 and the adjacent portions of the two folding threads lie immediately adjacent each other and are loosely connected to regions 76 which alternate between the upper and lower layers of fabric. However, at approximately the mid point of the bag, the folding thread 74 continues across the bag, but only engages regions 77 formed in the upper layer of fabric 71 of the bag, whereas the other folding thread 75 continues across the bag and only engages regions 78 provided in the lower layer 72 of the bag The bag then presents a folding characteristic as shown in FIG. 14, with part of the bag having a true "concertina" form and another part of the bag having an alternate form of folding The embodiments of FIGS. 7 to 13 have been described simply to demonstrate the wide range of possibilities for folding that can be accomplished using one or more folding threads of the type generally described.

FIG. 15 illustrates part of a motor vehicle 80, which is provided with a side curtain of the type illustrated more clearly in FIGS. 5 and 6.

The side curtain 81, as was described with reference to FIGS. 5 and 6 is initially contained within a housing or cavity formed in the roof of the vehicle. As seen in FIG. 5, a folding thread 82 is provided in that part of a side curtain 81 which is substantially aligned with the B-Post 83 of the motor vehicle The folding thread emerges from the inflatable curtain, when the inflatable curtain is in the folded un-inflated state and extends from a mounting point 84 provided in the roof of the motor vehicle, on which the inflatable curtain is mounted, to an anchoring point 85 mounted at the lower end of the B-Post 83 of the motor vehicle.

As the inflatable curtain 81 inflates, the direction of inflation will be guided by the folding thread, since as the inflatable curtain inflates it will be constrained to slide along the length of the folding thread 82.

FIG. 16 is a horizontal sectional view taken through part of a motor vehicle and a motor vehicle seat. The door 90 of the motor vehicle is illustrated located adjacent the seat 91. The seat 91 has a back-rest portion 92 and a side support 93. The side support 93 defines a recess 94 which accommodates a folded air-bag 95. The folded air-bag has, projecting from it, two folding threads. One folding thread 96 extends forwardly of the recess 94 and is connected, by means of a breakable connection 97, to a forward part of the side support 93.

The second folding thread 98 extends from the air-bag towards the rear of the recess 94 and is also connected, by means of a breakable connection 99 to a rearward part of the side support 93 of the seat.

On inflation of the air-bag 95, in response to a sensed side impact, the air-bag will be guided along the folding threads. The breakable connections 97 and 99 will break at predetermined instants permitting the air-bag, when fully inflated, to be located in a position in front of the side support 93 of the seat The inflated air-bag will thus be in position between the torso of an occupant of the seat and the side door. The air-bag will serve the function of protecting the main torso of the occupant from a side impact.

It is to be appreciated that the folding thread, as well as, or instead of, facilitating folding, and guiding the inflation of the bag, may be adapted to control the inflation of the air-bag in other ways. For example, in an embodiment similar to that shown in FIG. 1 and FIG. 2, at least some of the folding threads may be partially withdrawn from the bag during folding of the bag, and then the part of the folding thread that is being withdrawn from the bag may be secured to the seam of the bag Other folding threads may be left to enable the folding process to be completed generally in the manner as described above.

It is to be understood that in such an embodiment, as the air-bag is inflated, the bag will inflate until the folding threads that have been resecured to the bag are tight, and then the bag will be constrained so that the part of the bag with the folding threads will not be able to increase in size.

Thus, such an expedient may be used to prevent an air-bag inflating rapidly and impinging with an occupant of a vehicle who, for one reason or another, is located close to the housing containing the air-bag when the air-bag is inflated. The folding threads that have both ends secured may be designed to break or snap when a predetermined pressure is present within the bag, thus controlling the inflation characteristic of the bag.

Of course, folding threads which influence the inflation characteristic of the bag in these ways may be used with any design of bag, including a side curtain as shown in FIGS. 5 and 6, and a seat mounted bag as shown in FIG. 16.

We claim:

1. An air-bag, the air-bag being formed of fabric and being provided with at least one folding thread, the folding thread being connected loosely to discrete regions of the fabric, so that said regions of fabric may be slid along the folding thread, the thread having a part thereof accessible from the exterior of the bag.

2. An air-bag according to claims 1 wherein the folding thread has one part thereof secured to a region of the fabric of the bag, the arrangement being such that if the part of the thread accessible from the exterior of the bag is pulled relatively to the bag, the region where the thread is securely fastened to the fabric of the bag is drawn towards the region where the said part of the thread is accessible from the exterior of the bag, thus folding that part of the bag which initially lies between the region where the thread is securely fastened to the fabric of the bag and the region where the said part of the thread is accessible from the exterior of the bag.

3. An air-bag according to claim 1 wherein the air-bag comprises two super-imposed layers of fabric, the folding thread being connected loosely to said discrete regions of fabric which alternate between the two layers.

4. An air-bag according to claim 1 wherein the air-bag comprises two super-imposed layers of fabric, the folding thread being connected loosely to said discrete regions of fabric which are spaced apart in the same layer.

5. An air-bag according to claim 4 wherein there are at least two folding threads, a respective thread being associated with each of the said two layers of fabric.

6. An air-bag according to claim 1 wherein the said one end of the folding thread is secured to the fabric forming the bag in the region of a seam which inter-connects two layers of fabric.

7. An air-bag according to claim 2 wherein the said part of the folding thread accessible from the exterior of the bag is a free end of the thread opposed to the said one end.

8. An air-bag according to claim 2 wherein the said part of the folding thread that is accessible from the exterior of the bag is a central region of the thread, the folding thread having two ends, each end being secured to the fabric forming the bag.

9. An air-bag according to claim 1 wherein the air-bag, in the un-inflated state, is of substantially circular form.

10. An air-bag according to claim 9 wherein a plurality of folding threads are provided which extend diametrically across the bag.

11. An air-bag according to claim 9 wherein the folding thread extends parallel with one diameter of the bag, one end of the thread being secured to part of the outer peripheral seam of the bag, and the free end of the thread emerging from the bag at a point adjacent a gas generator which is associated with the bag.

12. An air-bag according to claim 9 wherein the air-bag is a circular air-bag, and at least two folding threads are provided which extend diametrically across the bag, the said two threads extending orthogonally to each other and intersecting substantially at the centre of the bag, parts of the threads in the region of the intersection being accessible from the exterior of the bag, the ends of each thread being secured to a peripheral seam defining the outer periphery of the bag.

13. An air-bag according to claim 1 of elongate form for use as a side bag.

14. An air-bag according to claim 9 wherein the bag is divided into parallel cells, there being a plurality of folding threads extending parallel to the cells.

15. An air-bag according to claim 1 wherein the said discrete regions are evenly spaced.

16. An air-bag according to claim 1 wherein the said discrete regions are unevenly spaced.

17. An air-bag according to claim 1 wherein the bag is folded and a part of one or more folding threads extends from the bag and is mounted to guide the bag as it inflated.

18. An air-bag according to claim 1 wherein the air-bag includes a folding thread, the thread having a first end secured to the bag, and having a second end secured to the bag, the thread having been partly withdrawn from the bag before the second end is secured to the bag.

19. An air-bag according to claim 18 wherein the thread is adapted to break when a predetermined pressure is present within the bag.

20. A method of folding an air-bag, the method comprising the steps of taking an air-bag according to claim 1 and applying tension to the parts of the folding thread or threads accessible from the exterior of the bag relative to the bag in order to fold the bag.

21. A method according to claim 20 comprising the additional step of cutting off the part of the or each folding thread that is accessible from the exterior of the bag at the end of the folding operation.

22. A method according to claim 20 comprising the step of securing the folding thread to the air-bag after withdrawing part of the folding thread from the air-bag.

23. An air-bag, the air-bag comprising two superimposed layers of fabric, the air-bag being provided with at least one folding thread, the folding thread having one end thereof securely fastened to the fabric forming the bag, the thread being connected loosely alternately to each of the layers of fabric, the thread having a part thereof accessible from the exterior of the bag, the arrangement being such that if the part of the thread accessible from the exterior of the bag is pulled, the region there the thread is securely fastened to the fabric of the bag is drawn towards the region where the said part of the thread is accessible from the exterior of the bag, thus folding that part of the bag which initially lies between the point where the thread is securely fastened to the fabric of the bag and the region where the said part of the thread is accessible from the exterior of the bag.

* * * * *